UNITED STATES PATENT OFFICE.

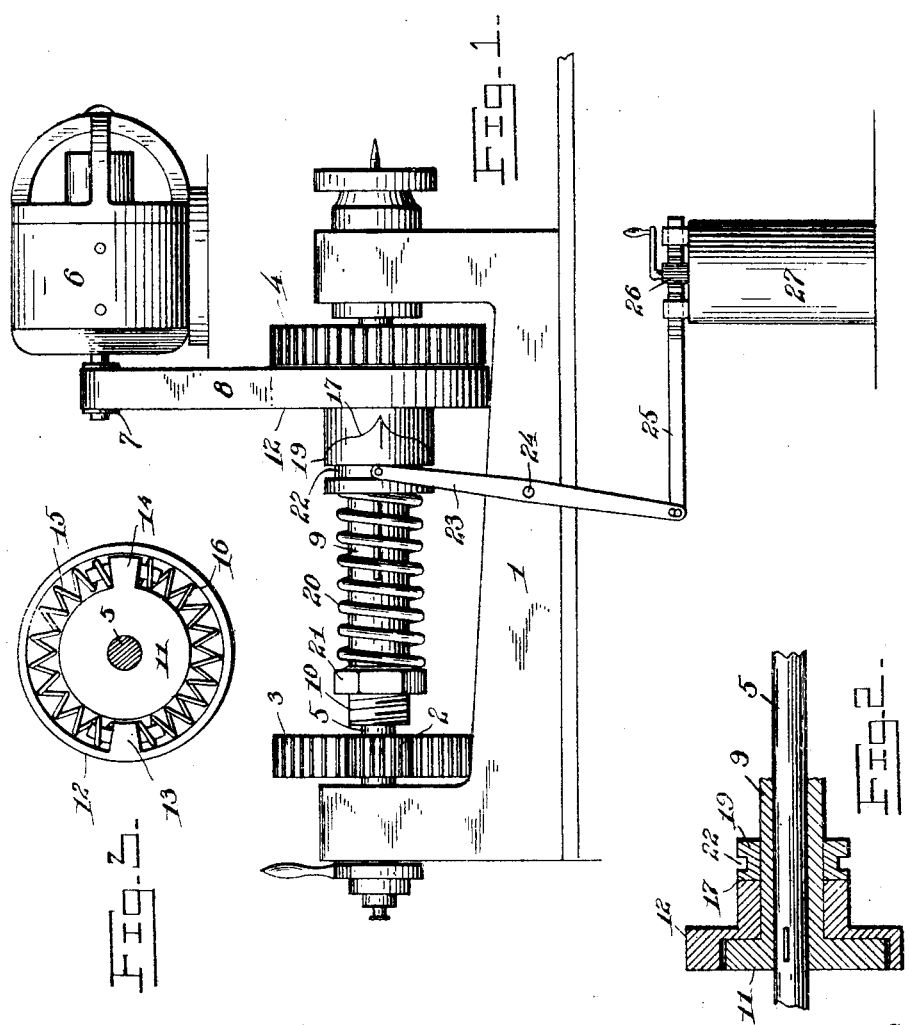

HOWARD A. COOMBS, OF WASHINGTON, DISTRICT OF COLUMBIA.

VARIABLE-SPEED DRIVING MECHANISM.

No. 799,717.      Specification of Letters Patent.      Patented Sept. 19, 1905.

Application filed January 30, 1905. Serial No. 243,437.

*To all whom it may concern:*

Be it known that I, HOWARD A. COOMBS, a citizen of the United States, residing at Washington, in the District of Columbia, have invented new and useful Improvements in Variable-Speed Driving Mechanisms, of which the following is a specification.

My invention relates to the driving mechanism of machine-tools and the like; and its object is to increase the efficiency of such machines by automatically regulating the speed thereof in inverse proportion to the load.

It is well known that the individual drive of machines by electric motors is being extensively adopted in machine-shops, textile-mills, &c., and of late years variable-speed motors are coming into use, whereby intermediate change-speed gearing is rendered unnecessary.

The theoretically ideal drive for a machine-tool—such as a lathe, for example—would be an electric motor mounted directly on the live-spindle, the speed of which could be varied within wide limits and which would develop approximately constant power at all speeds.

Both direct and alternating current variable-speed motors are now on the market which will develop a constant power throughout a considerable range of speeds, the minimum speed of which, however, is usually higher than that at which a lathe is often required to run, so that some form of reduction-gearing is necessary.

My invention contemplates the use of some form of variable-speed electric motor belted or geared to a lathe, milling-machine, or other machine-tool, with a transmission member between the motor and tool which will yield within limits under load, the said transmission member being operatively connected to the controller of the motor, so that the speed of the latter will be automatically varied in inverse proportion to the load on the machine.

It is now the almost universal custom to control the speed of lathes (and other machine-tools) by hand, and as a natural consequence they are frequently run at a lower speed than is warranted by the work. It is impracticable for the workman to be constantly changing the speed even when he realizes that a higher speed might be used, and his judgment as to the proper speed to be used in order to obtain the maximum output may not be correct.

It is the object of my invention to eliminate the necessity of the workman's changing the speed and to provide means whereby the load itself on the machine automatically controls the speed at all times.

Assuming by way of illustration that a certain lathe absorbs about five-horse power when it is doing the maximum amount of work of which it is capable without injury, this amount of power may be required by a heavy cut when the lathe is running quite slowly or it may be required by a lighter cut when the lathe is running at a higher speed. Other considerations—such as wear and tear of the lathe, smoothness and accuracy of the cut—enter into the problem in practice, and therefore subordinate speed-changing means, such as cone-pulleys or the like, may be employed; but the general proposition is, as stated above, that the speed of the lathe should always increase when the cross-sectional area of the chip being removed decreases, and vice versa. By my invention I provide means whereby the speed is automatically governed by the load, so that without any attention at all on the part of the operator the lathe will speed up whenever the tool runs out of its cut or whenever the size of the cut decreases and will slow down whenever the resistance increases. These variations in speed take place of course within certain limits, and the mechanism may be arranged, as will be obvious, so that the power will be cut off entirely whenever an abnormal resistance is encountered, whereby a safeguard against accident and breakage is provided. It will be noticed also as a natural consequence of the operation described that the lathe will always run at full speed when no cut is being taken, whereby a great saving of time is effected, as on the return travel of the carriage.

While ball-governors and the like may be adjusted so as to be very sensitive to respond to variations in speed, it is nevertheless a fact that a variation in speed of the driving or driven member must actually take place before the speed-controller comes into action. Thus the load acts indirectly upon the controller, while in my invention the load acts directly upon the controller. In the majority if not all of prior instances of automatic controllers the object was to keep the speed of the driven member constant, and while my invention includes that result among its functions its particular object is to increase the speed when the load becomes light, and vice versa, as explained above in its application to machine-tools.

In the accompanying drawings, Figure 1 shows diagrammatically my invention applied to a lathe driven by a variable-speed electric motor. Fig. 2 is a longitudinal section through the yielding transmission member on the lathe-spindle, and Fig. 3 is an end view of said member.

In the views, 1 represents the head-stock of a lathe, 2, 3, and 4 the back gears thereof, and 5 the spindle.

6 represents a variable-speed electric motor, 7 the driving-pulley thereof, and 8 the belt connecting it to the spindle 5. Of course suitable reversing mechanism will be provided as usual. Secured to the latter is a sleeve 9, one end of which is screw-threaded, as shown at 10, for a purpose to be hereinafter described. The other end of said sleeve carries or is formed into a collar 11, which constitutes the hub of the driving-pulley 12 for the lathe-spindle. Said pulley surrounds the collar 11, as shown, and has projecting radially inwardly from one portion of its periphery a lug 13, while said collar has a corresponding outwardly-projecting lug 14. Between these lugs are arranged compression-springs 15 and 16, which tend to hold said lugs in the diametrically opposite position shown in Fig. 3.

The pulley 12 is free to turn on the sleeve 9 within the limits permitted by the springs and carries the cam-surfaces 17, which coöperate with the conjugate cam-surfaces 17, formed on a collar 19, keyed to slide on the sleeve 9, and pressed against the cam-surfaces of the pulley by a spring 20. The force of said spring can be adjusted by a nut 21, engaging the screw-threaded portion 10 of the sleeve 9. The collar 19 has an annular groove 22 formed therein, in which engages one end of a lever 23, pivoted at 24 to the head-stock or otherwise and connected at the other end to a rack-bar 25, which meshes with a pinion 26 on the shaft of the controller 27 for the motor.

The operation will now be evident. As the load on the lathe increases the collar 19 is cammed along the sleeve 9 against the pressure of the spring 20, and the shaft of the controller is turned to reduce the speed of the motor by the lever-and-rack connection described.

The arrangement shown is by way of illustration only, and various modifications and additions may be made without departing from the principle of my invention as expressed in the following claims.

I claim—

1. The combination with a driven shaft, of a variable-speed electric motor, connections therefrom to said shaft including a transmission member constructed to yield under load, a controller for said motor and connections from said member to said controller, whereby the speed of the motor is automatically governed by the load on said shaft.

2. The combination with the live-spindle of a lathe or other machine-tool, of a variable-speed electric motor, connections between said motor and spindle including a transmission member constructed to yield under load within limits, a controller for said motor, a collar arranged to be moved longitudinally of said spindle by the yielding of said member and connections from said collar to said controller, whereby the speed of the motor is automatically governed by the load on said spindle.

3. The combination with the live-spindle of a lathe or other machine-tool, of a pulley yieldably connected to said spindle, a collar arranged to be moved longitudinally of said spindle by the yielding of said member, a spring to return said collar, a variable-speed electric motor belted to said pulley, a controller therefor and connections between said collar and controller whereby the speed of the motor is automatically governed by the load on said spindle.

4. The combination with the live-spindle of a lathe or other machine-tool, of a pulley mounted thereon, a spring connecting said pulley and spindle, a cam-collar arranged to be moved longitudinally of said spindle by the angular movement of said pulley relatively to said spindle, a lever arranged to be actuated by the movement of said collar, a variable-speed electric motor, connections therefrom to said pulley, a controller for said motor and connections between said lever and controller, whereby the speed of said motor is governed by the load on said spindle.

In testimony whereof I have affixed my signature in presence of two subscribing witnesses.

HOWARD A. COOMBS.

Witnesses:
J. B. ROMAN,
L. L. ARMSTRONG.